United States Patent
Rodriguez-Moral

(10) Patent No.: US 6,260,072 B1
(45) Date of Patent: Jul. 10, 2001

(54) METHOD AND APPARATUS FOR ADAPTIVE ROUTING IN PACKET NETWORKS

(75) Inventor: Antonio Rodriguez-Moral, Highlands, NJ (US)

(73) Assignee: Lucent Technologies INC, Murray Hill, NJ (US)

( * ) Notice: Subject to any disclaimer, the term of this patent is extended or adjusted under 35 U.S.C. 154(b) by 0 days.

(21) Appl. No.: 08/873,608

(22) Filed: Jun. 12, 1997

(51) Int. Cl.[7] .................................................. H04Q 7/22
(52) U.S. Cl. ............................................. 709/241; 709/238
(58) Field of Search ..................................... 709/218, 223, 709/224, 239, 240, 241, 242, 238, 235; 370/238, 237, 351, 372, 389, 400, 412, 235, 231, 388, 390, 413, 234, 255, 230, 236; 710/53

(56) References Cited

U.S. PATENT DOCUMENTS

| | | | | |
|---|---|---|---|---|
| 4,556,972 | * | 12/1985 | Chan et al. ........................ | 370/355 |
| 5,121,383 | * | 6/1992 | Golestani ............................ | 370/235 |
| 5,253,248 | * | 10/1993 | Dravida et al. ..................... | 370/228 |
| 5,313,454 | * | 5/1994 | Liron et al. ........................ | 370/395 |
| 5,377,327 | * | 12/1994 | Jain et al. .......................... | 709/235 |
| 5,412,654 | * | 5/1995 | Perkins .............................. | 370/312 |
| 5,467,345 | * | 11/1995 | Cutler, Jr. et al. ................. | 370/229 |
| 5,491,801 | * | 2/1996 | Jain et al. .......................... | 709/241 |
| 5,495,479 | * | 2/1996 | Gallaand et al. ................... | 370/404 |
| 5,506,847 | * | 4/1996 | Shobatake ......................... | 370/338 |
| 5,557,607 | * | 9/1996 | Holden .............................. | 370/58.2 |
| 5,570,346 | * | 10/1996 | Shur ................................... | 370/231 |
| 5,583,861 | * | 12/1996 | Holden .............................. | 370/395 |
| 5,583,862 | * | 12/1996 | Callon ................................ | 370/397 |
| 5,594,734 | * | 1/1997 | Worsley et al. ................... | 370/395 |
| 5,600,630 | * | 2/1997 | Takano et al. ..................... | 370/218 |
| 5,666,360 | * | 9/1997 | Chen et al. ........................ | 370/390 |
| 5,671,222 | * | 9/1997 | Chen et al. ........................ | 370/388 |
| 5,671,445 | * | 9/1997 | Gluyas et al. ..................... | 710/53 |
| 5,699,361 | * | 12/1997 | Ding et al. ......................... | 370/431 |
| 5,740,164 | * | 4/1998 | Liron ................................. | 370/316 |
| 5,790,536 | * | 8/1998 | Mahany et al. .................... | 370/338 |
| 5,802,278 | * | 9/1998 | Isfeld et al. ........................ | 709/218 |
| 5,805,816 | * | 9/1998 | Picazo, Jr. et al. ................ | 709/223 |
| 5,812,526 | * | 9/1998 | Chang et al. ..................... | 370/230 |
| 5,828,844 | * | 10/1998 | Civanlar et al. ................... | 709/228 |
| 5,844,887 | * | 12/1998 | Oren et al. ......................... | 370/218 |
| 5,905,712 | * | 5/1999 | Cresswell et al. ................. | 370/238 |
| 5,910,942 | * | 6/1999 | Grenot et al. ..................... | 370/236 |
| 5,920,566 | * | 7/1999 | Hendel et al. .................... | 370/401 |
| 5,920,568 | * | 7/1999 | Kurita et al. ...................... | 470/412 |
| 5,930,254 | * | 7/1999 | Liron et al. ........................ | 370/395 |
| 5,940,372 | * | 8/1999 | Bertin et al. ...................... | 370/238 |
| 5,963,546 | * | 10/1999 | Shoji ................................. | 370/255 |
| 5,970,232 | * | 10/1999 | Passint et al. ..................... | 709/238 |
| 5,996,021 | * | 11/1999 | Civanlar et al. ................... | 709/238 |
| 6,016,306 | * | 1/2000 | Le Boudec et al. ............... | 370/235 |

OTHER PUBLICATIONS

Carter et al., Measuring Bottleneck Link Speed in Packet–Switched Networks, Computer Science Department, Boston University, Mar. 1996.*

J. Moy., Network Working Group, RFC 1583, OSPF Version 2, Proteon, Inc., Mar. 1994.*

* cited by examiner

*Primary Examiner*—Mehmet B. Geckil
*Assistant Examiner*—William C. Vaughn, Jr.
(74) *Attorney, Agent, or Firm*—Gregory A. Welte

(57) ABSTRACT

A system for routing data packets in a packet network. Packets are classified as either type-1 or type-2. Each type is routed to its destination on a smallest-delay path. However, each type can experience a different time delay between nodes in the network. Thus, the smallest-delay path for a type-1 packet may be different from that for a type-2 packet, even if the origin and destination of both types are the same. Further, these time delays can change. The invention monitors the changes, and continually identifies the smallest-delay paths for the packets.

10 Claims, 9 Drawing Sheets

FIG. 1
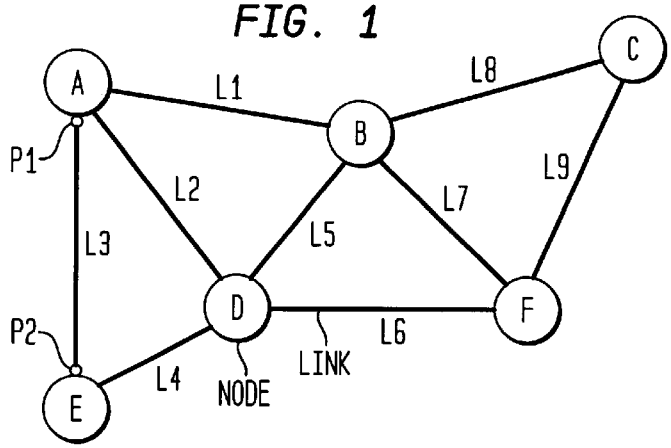
FIG. 2A
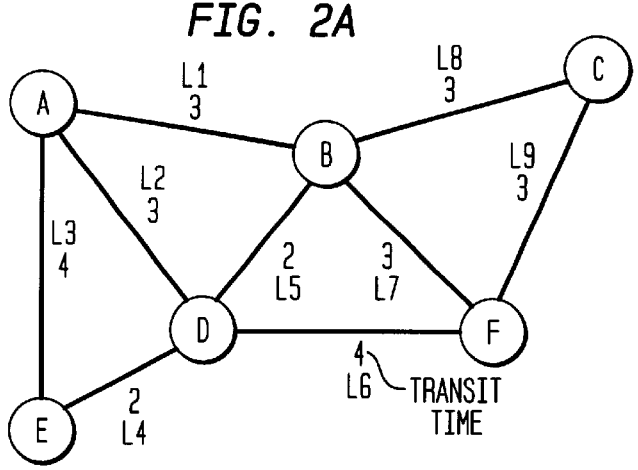
FIG. 2B
| | SHORTEST-TIME PATHS BETWEEN NODES | | | | | |
|---|---|---|---|---|---|---|
| DESTINATION | A | B | C | D | E | F |
| A | X | | | | | |
| B | L1 | X | | | | |
| C | L8,L1 | L8 | X | | | |
| D | L2 | L5 | L5,L8 | X | | |
| E | L3 | L4,L5 | L4,L5,L8 | L4 | X | |
| F | L7,L1 | L7 | L9 | L6 | L6,L4 | X |
ORIGIN

FIG. 7
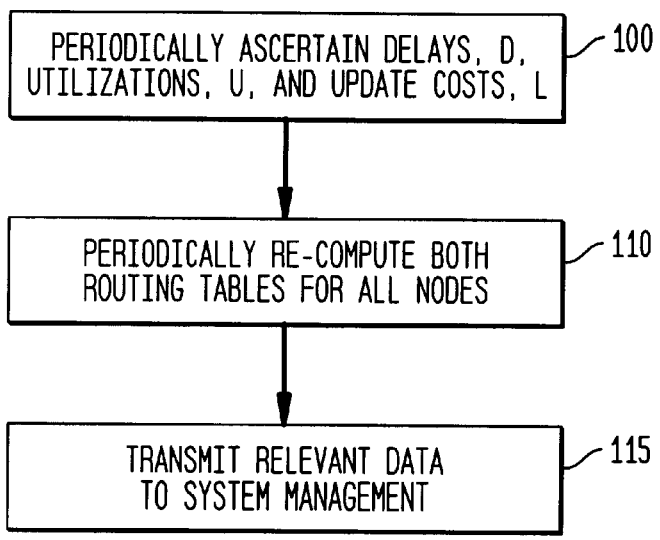
FIG. 8A
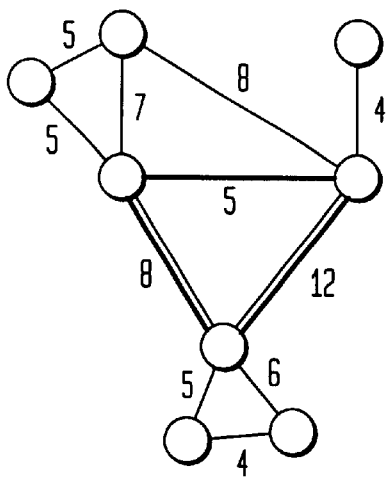
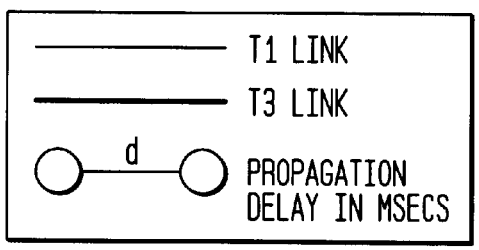

FIG. 9A

```
tick()
    {
      delay d;
      utilization u;
      d=LIBRA_Monitor->get_delay();
      u=LIBRA_Monitor->get_utilization();
      AQUA->update_link_cost(u,d);
    }
}

AQUA{
  //auxiliary functions and memory storage compute_link_cost_TOS1(delay d)
  { linkcost L1n;      // new value of link cost for delay sensitive traffic
    static linkcost L1;// Stores previous value of link cost for delay sensitive traffic
    const a;           // alfa
    integer q;

q = 1 + Int(97.5*a);
    L1n = 1 + Int(((1-a)*q) + a*L1);

if (((L1n-L1)/L1)>=0.75)// update value of link cost for delay sensitive traffic
        L1 = Ln;

return (L1);
  } compute_link_cost_TOS2(utilization u)
    { linkcost L2n;       // new value of link cost for sensitive traffic
    static linkcost L2  // Stories previous value of link cost for throughput
                        // sensitive traffic
    const b;            // beta
    integer q;
```

FIG. 9B

```
        q = 1 + Int(u * 1000);
        L2n= 1 + Int(((1-b)*q) + b*L2);

if (((L2n-L2)/L2) >= 0.15)  // update value of link cost for throughput
                                        // sensitive traffic L2 = L2n;

return (L2);
    } update_link_cost(utilization u, delay d)
    {
        // declaration of variables
        linkcost Ic1;   // Associated with delay sensitive traffic
        linkcost Ic2;   // Associated with non-delay sensitive traffic
        Ic1 = compute_link_cost_TOS1(d);
        OSPF->new_link_cost(1,Ic1)
        Ic2 = compute_link_cost_TOS2(u);
        OSPF->new_link_cost(2,Ic2);
    }

}
```

METHOD AND APPARATUS FOR ADAPTIVE ROUTING IN PACKET NETWORKS

The invention concerns adaptive routing in packet networks, in order to reduce network congestion, and to optimize selected parameters, such as throughput and end-to-end packet delays.

BACKGROUND OF THE INVENTION

A simplified network will be explained, in order to provide background regarding basic concepts and terminology.

FIG. 1 illustrates a network containing nodes A–F and links L1–L9. The nodes are physical stations, which contain one, or more, computers, and associated equipment. For example, a university's computer system may act as a node. The nodes receive data from other nodes, or from external sources (not shown). The nodes may process the data, but in the present context, their most important function is to store the data temporarily, and forward the data to other nodes.

Links are data transmission channels, used to carry data between nodes. For example, a common telephone line represents one exampletype of link; a satellite communication link and an optical fiber link represents two others.

A common characteristic of networks is that every node is not necessarily connected to every other node. For example, in FIG. 1, node A is not connected to node F. If these two nodes wish to transmit data to each other, they must find a path, such as the combination of links L1+L7 or the combination of links L2+L6.

However, not all paths are equally desirable. One reason is that each link imposes a time delay, and these time delays are not uniform. FIG. 2A provides an example of time delays for the network of FIG. 1, and indicates that the combination L1+L7, mentioned in the previous paragraph, represents a time delay of 6 units, while the combination of L2+L6 represents a longer time delay of 7 units.

In many cases, it is preferred to utilize the path imposing the smallest overall time delay. Well-known algorithms, such as the Dijkstra algortithm, are available for ascertaining these shortest-time paths, for all pairs of nodes in a given network. FIG. 2B provides an example of a table of shortest-time paths for the network of FIG. 1. Some spaces are left blank because they represent redundancy: for example, the time from B to C is the same as that from C to B.

One mode of utilizing such tables resides in "next-hop" routing. In next-hop routing, each node does not refer to the entire contents of the shortest-path table, but, instead, utilizes an abbreviated table, termed a "routing table," which is derived from the shortest-path table.

FIG. 3 illustrates the next-hop routing table 2 used by node F. If node F wishes to transmit data to node A, node F routes the data to node B, as indicated. Node B, according to its own next-hop routing table (not shown), then routes the data to node A. The indirect path is F-to-B-to-A, using the link pair L7+L1 of FIG. 2A, consistent with the shortest-path table of FIG. 2B, for the node-pair (F, A).

One problem with next-hop routing, as just described, is that, as a matter of probability, the links having the shortest delay times are those most likely to appear in the shortest-time table of FIG. 2B, and thus most likely to be used in the routing tables. Consequently, under conditions of high data traffic, the nodes at the ends of these links can become congested. When congestion occurs, data traffic at these nodes can become stalled temporarily.

The congestion, in effect, causes the transit times shown in FIG. 2A to increase. However, the nodes continue to route their packets along the same paths, despite these increases, because the routing tables do not change: they are static. Static routing tables do not accommodate network congestion well, because they do not take into account the variable nature of network traffic.

SUMMARY OF THE INVENTION

In one form of the invention, data packets are routed in a network according to next-hop routing tables, which are derived based on measured packet delays and link utilization between nodes. The tables are updated as the delays or utilization change.

BRIEF DESCRIPTION OF THE DRAWINGS

FIG. 1 illustrates a generic network.

FIG. 2A illustrates transit times of the network of FIG. 1, and FIG. 2B illustrates a shortest-time routing table for the network.

FIG. 7 illustrates flow charts and the updating of the next-hop routing tables, which occurs when link costs change sufficiently.

FIG. 8A illustrates a network used in a simulation of the invention, compared with other types of routing.

FIG. 9 illustrates computer code used by the invention.

DETAILED DESCRIPTION OF THE INVENTION

The invention applies to packet networks, and preferably to those based on the IP (Internet Protocol) protocol. IP packet networks are in widespread use today, for example, in the INTERNET, in corporate IP networks (also called intranets), and in Internet Service Provider (ISP) networks.

OVERVIEW

Information is transmitted across the network in the form of packets. The packet is the minimum unit of information subject to transport and control in a packet network. Packets are variable in size: different packets can contain different numbers of bytes.

The invention handles packets of two different types, depending upon the Type of Service (TOS) provided to the packet.

The service provided to TOS-1 packets is designed to reduce, or minimize, the time delay experienced by the packet during transmission from its origin to its destination. TOS-1 packets will generally be of small size.

The service provided to TOS-2 packets is not designed to necessarily minimize time delay, because such packets are not so sensitive to such delay. They are probably, but not necessarily, of large size.

The application, or computer program, generating the packets, such as an electronic mail program, inserts tags into the packets which specify the TOS requested.

Each packet, within the network, may be assigned to an "originating node." The originating node may create the packet, or may receive the packet from a source outside the network, such as from a person operating a microcomputer.

The originating node may retain the packet, if the packet is destined for the originating node, or the originating node may transfer the packet to a receiving node. The receiving node may retain the packet, or transfer the packet to a third node. This transfer process continues until the packet reaches its destination.

Each packet contains identifiers, which identify (1) the packet's destination node and, as stated above, (2) the packet type (i.e., TOS-1 or TOS-2). For each packet type, each node stores a routing table: one routing table is used for TOS-1 packets, and the other is used for TOS-2 packets. Two different routing tables are used because it is desired to find separate paths, if possible, for both packet types to satisfy their different requirements regarding end-to-end delay. As an example, FIG. 4, right side, indicates the two routing tables derived for node F.

When the originating node receives, or creates, a packet, the originating node first uses a routing table to identify the link on which the packet will be transmitted. Then, the node places the packet into one of two queues assigned to that link, based on the packet-type identifier. That is, TOS-1 packets are placed into a TOS-1 queue, and TOS-2 packets are placed into a TOS-2 queue.

Figure 3:
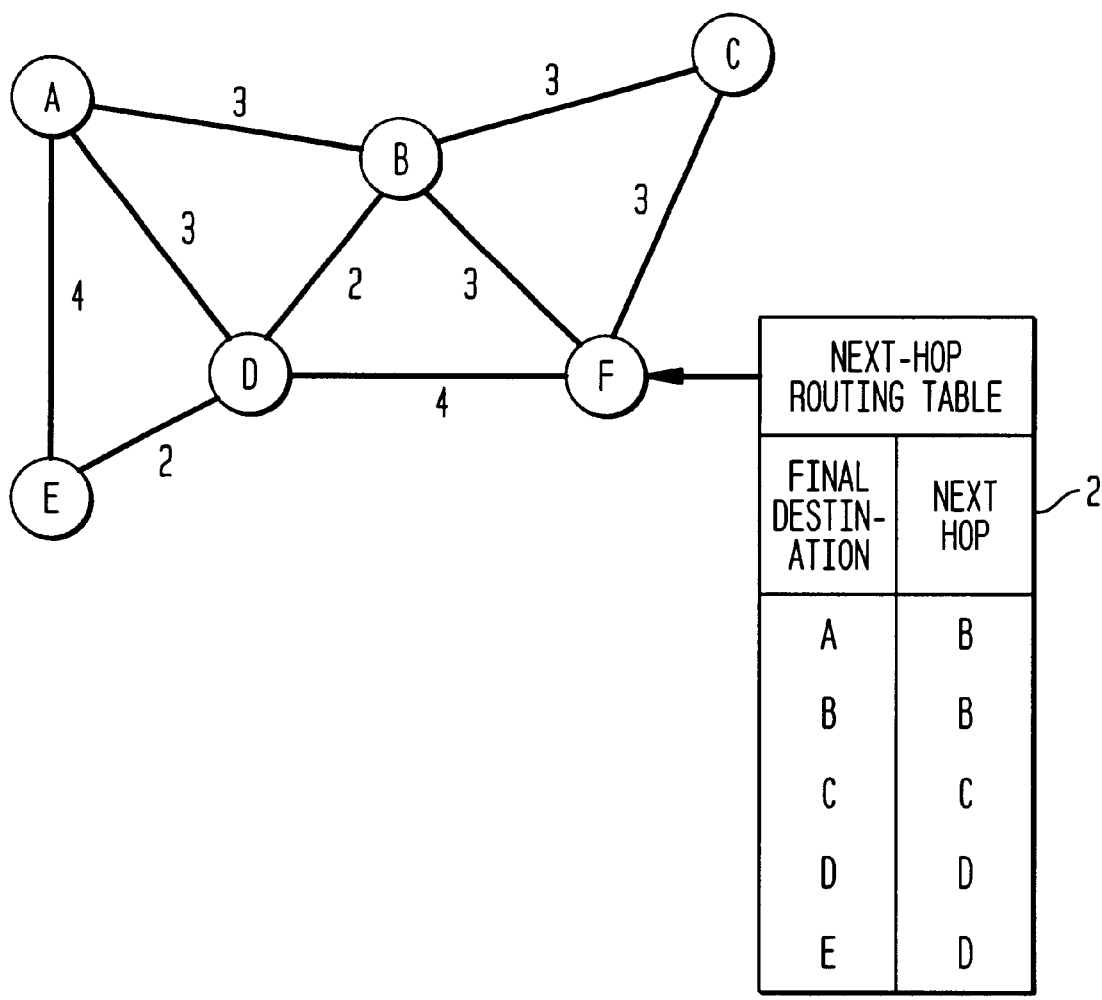
FIG. 3 illustrates a next-hop routing table for node F, which was derived from the shortest-time routing table of FIG. 2B.
Figure 4:
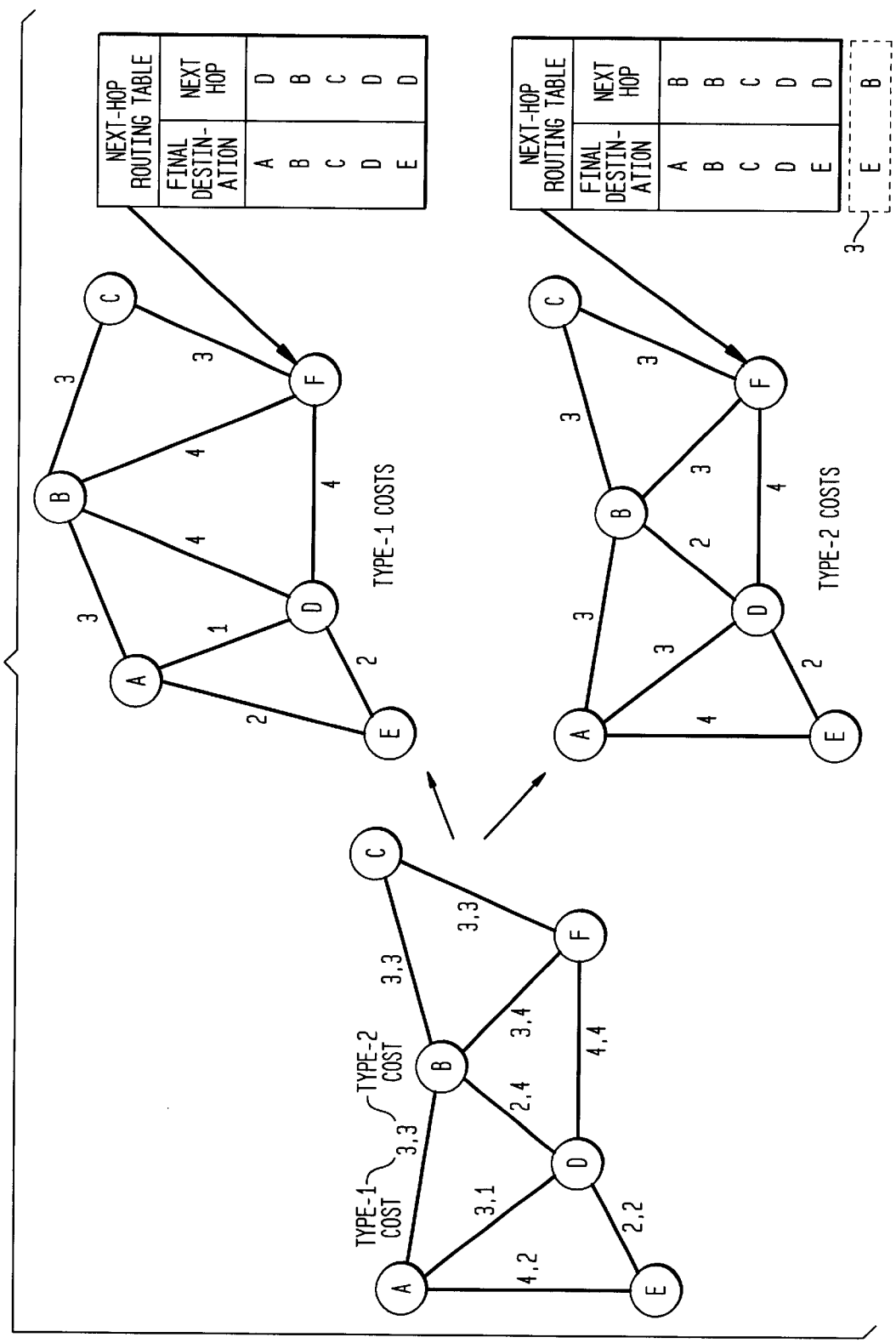
FIG. 4 illustrates the use of two next-hop routing tables in a network.

As a specific example, three links are connected to node A in FIG. 4. A pair of queues is assigned to each link. Each pair contains a queue for TOS-1 packets, and a queue for TOS-2 packets.

The queues are each emptied in a first-in-first-out (FIFO) manner. The originating node (1) withdraws a single packet from the TOS-1 queue, (2) reads the destination node from the packet, and (3) transmits the packet to another node, based on the originating node's TOS-1 routing table.

The originating node then (1) withdraws a single packet from the TOS-2 queue, (2) reads the destination node from the packet, and (3) transmits the packet to another node, based on the originating node's TOS-2 routing table.

The originating node then returns to the TOS-1 queue, and repeats the process.

Each node which receives a packet from the originating node then becomes an originating node, and executes the same procedures just described, using two queues and two routing tables (unless, of course, that node is the destination of the packet, in which case the node retains the packet).

As explained in the Background of the Invention, the effective transit times between nodes can change, in response to network traffic, for example. To accommodate these changes, the invention monitors the changes in transit times. When the changes become sufficiently great, the invention adjusts the routing tables. (As will be seen, the invention monitors a more complex quantity than the transit times discussed in the Background. However, for this present Overview, the fact of adjustment of the routing tables is emphasized, rather than the particular quantities involved in the adjustment.)

The preceding Overview allows the following summary:
1. Each packet is assigned one of two packet types, TOS-1 or TOS-2.
2. Each node maintains a pair of queues for each output link of the node. In each pair, one queue is used for TOS-1 packets, and the other is used for TOS-2 packets.
3. Each node maintains two routing tables, one for each packet type.
4. Each node processes the queues by
   a) withdrawing a single packet from one queue, and transmitting the packet to another node, based on the routing table for the service type of that queue;
   b) withdrawing a single packet from the other queue, and transmitting the packet to another node, based on the routing table for the service type of that queue; and
   c) repeating (a) and (b).
   This queue-processing is termed "scheduling."
5. The invention monitors the transit times over the links, and modifies the routing tables when the transit times change significantly.

INVENTION IN GREATER DETAIL

Invention Provides Two Types of Service

Under the invention, two classes of service are provided: type-1 (TOS-1) service is provided for urgent packets, which are also called delay-sensitive packets, and type-2 (TOS-2) service is provided for less urgent packets, which are also called throughput-sensitive packets. In type-1 packets, the number of bytes is expected to be "small." In type-2 packets, the number is expected to be "large."

The dividing line between "small" and "large" will depend upon different circumstances, but, in general, small packets typically contain 64 to 512 bytes, while large packets contain more than 512 bytes.

The originator of a packet tags the packets with a label indicating the type of service requested. For example, the originator may be an electronic mail system, located within, or without, the network. The electronic mail system generates packets. A header in each packet contains a field, which contains a tag designating the service-type (i.e., type-1 or type-2) requested for the packets.

Therefore, incoming packets to the network are divided into two types: (1) delay-sensitive packets and (2) non-delay-sensitive packets. Each packet indicates its respective packet-type.

Each Type of Service is Routed Differently

Different Types of Service Incur Different Costs

In the Overview, "transit times" between nodes were considered. However, the invention utilizes a more complex parameter than the physical transit times across the links, and this parameter will be termed a "cost."

One example of a cost is the time delay experienced by a packet between (a) an input port P1 in FIG. 1 of node A and (b) an input port P2 of node E. This time delay will depend not only on the physical transit time across link L3, but also on processing delays occurring at node A. For example, if node A is congested with traffic, the cost may be greater than if node A were idle.

The particular cost just described is a single example of a cost. The term "cost" is generic, and represents a parameter, or metric, which is to be minimized (or maximized). For example, cost can represent monetary cost, time delay, data flow rate, or other parameter to be minimized (or maximized). Further, costs are assigned to links, even though the characteristics of the link do not determine the cost exclusively, but behavior of nodes may also affect the cost.

Still further, more than one cost can be assigned to each link: each type of service can incur a different cost on a given link. To explain the latter, an analogy is perhaps appropriate. A type-1 packet can be analogized to a postcard, and type-2 packets can be analogized to pages of a book. It is likely that the postcard can be packed into a single packet, and that the book will require numerous packets.

However, it is likely that the postcard-packet will be not completely filled. On the other hand, it is likely that every packet in the book-packet will be completely filled, with the exception of a single last packet, which will hold the final paragraphs of the book's contents.

Thus, it is not surprising that the average cost, per packet, will be different, for the two cases. The average postcard-packet, which is partially filled, will experience a lower cost, because less data, per packet, is transferred. The average book-packet will experience a higher cost, because more data, per packet, is transferred.

Independent of the preceding reasons, the invention itself creates a difference in costs for the two classes. This difference will be explained in greater detail below but, in brief, the dual-queue scheduling procedure itself can create a difference in costs for the two packet types. As a simple example, consider two cases.

Case 1. Assume that a given node receives (a) five type-2 packets, and (b) five type-1 packets. Assume that all packets will be routed to the same next-hop, so that all packets are placed into the same pair of queues.

Using the dual-queue scheduling process, that node will schedule these packets by interleaving the five type-1 packets between the five type-2 packets. The scheduling sequence will be:

1-2-1-2-1-2-1-2-1-2.

With this scheduling sequence, the type-2 packet will not be transmitted until almost all type-1 packets have been transmitted. Thus, the presence of the type-1 packets delays the type-2 packet.

Case 2. Consider the same assumptions, and assume that the node receives the same type-2 packet, but no type-1 packets. The scheduling sequence will be 2-2-2-2-2.

No delay is imposed because of the presence of any type-1 packets, as in Case 1.

Therefore, for these, and other reasons, the average cost, per packet, will be different for the two types of service. (Of course, in some cases, the average costs may be identical.)

Routing According to Service Type

Each node maintains two routing tables, one for each service type. FIG. 4 provides an example. The left side of the Figure shows two costs for each link, with one cost being given for each type of service. The details of computation of these costs will be explained below. Using these costs, two next-hop routing tables are developed for each node, one table for each service type. The right side of the Figure indicates two such routing tables for node F.

COMPUTATION OF COSTS

The costs are computed according to equations given below. The variable "LL" represents cost.

Utilization Variable, U

In computing the costs, each node computes an average utilization, U, for each output link connected to it. For example, node A in FIG. 1 will compute three U's, one for each of link L1, L2, and L3.

Average utilization is the fraction of time that the scheduler is busy transmitting packets on a link. From another point of view, utilization is the fraction of the scheduler's capacity which is actually used. At each node, one scheduler is provided for each output link, and its pair of queues.

As a numerical example of utilization, assume a link scheduler having a capacity of one million bytes per second, which serves two incoming packet flows, from two respective queues. The first flow contains a constant flow of 1,000 packets per second, with a fixed packet size of 128 bytes. The second flow contains a random packet flow rate, with a fixed packet size of 256 bytes.

Assume that, during a particular 3-second interval, the second flow is 2,000 packets per second. The utilization of the link is the fraction of time, during these 3 seconds, that the scheduler is busy. Mathematically, the utilization is (total bytes processed)/(scheduler capacity for time of process)

or (1,000×128×3+2,000×256×3)/(3×1,000,000)=0.43.

Delay Variables, D

An average delay D1 is computed for type-1 packets, for each link. This average delay includes queuing, scheduling, and transmission delays. This delay, in effect, measures the time delay a packet experiences in travelling from the input port of one node, such as port P1 in FIG. 1, to the input port of a neighboring node, such as P2. Numerous approaches, known in the art, exist for measuring these delays.

In one approach to measuring D1, each node can periodically insert a sample packet into its type-1 queue. The sample packet contains a time-stamp, which indicates the exact time of the insertion. This node sends the sample packet to each of the nodes listed in its next-hop routing table.

Each receiving node (1) reads the time-stamp, (2) compares the time-stamp with present absolute real time, and (3) ascertains the time delay, D1. Each receiving node reports the time delay D1 to all other nodes.

A second average delay, D2, is computed for all packets, namely, both type-1 and type-2. This delay is computed in the same manner as D1, with the exception, of course, that all packets are considered, not just type-1 packets, as in D1.

Using these variables, the link costs are computed according to the following equations:

$$LL1_{ik}(t+\epsilon) = \begin{bmatrix} 1 + \text{INTEGER}\{(1-\alpha)Q_D[D1_{ik}(t)] + \alpha LL1_{ik}(t)\} & \text{IF} \left| \frac{LL1_{ik}(t+\epsilon) - LL1_{ik}(t)}{LL1_{ik}(t)} \right| \geq 0.75 \\ LL1(t) & \text{otherwise} \end{bmatrix} \quad \text{Equation 1}$$

$$LL2_{ik}(t+\epsilon) = \begin{bmatrix} 1 + \text{INTEGER}\{(1-\beta)Q_U[U_{ik}(t)] + \beta LL2_{ik}(t)\} & \text{IF} \left| \frac{LL2_{ik}(t+\epsilon) - LL2_{ik}(t)}{LL2_{ik}(t)} \right| \geq 0.15 \\ LL2(t) & \text{otherwise} \end{bmatrix} \quad \text{Equation 2}$$

In these expressions $$0 \leq \alpha \leq 1.0$$

$$Q_D(x) = 1 + \text{INTEGER}(97.5x)$$

$$Q_v(x) = 1 + \text{INTEGER}[x 10^3]$$

These costs are used to compute the routing tables, preferably using the well-known Dijkstra algorithm. For each node, this algorithm computes the shortest path from that node to every other node in the network. That is, if the network contains the given node and 8 other nodes, then eight shortest paths will be computed. "Shortest" means smallest cost.

Several significant features of these computations are the following.

1. Each "LL" refers to the cost associated with a link, with LL1 referring to the cost for type-1 packets, and LL2 referring to the cost of type-2 packets. The subscripts "ik" refer to the end-nodes of the link which is being computed. For example, in FIG. 1, link L1 (not to be confused with the variable LL1 in the equations above) would appear as $LL_{AB}$ in the equations above. of course, for convenience in writing computer code, the nodes may be indicated by numbers, rather than letters, so that numerical subscripts can be used.

2. The "epsilon" $\epsilon$ in the equations refers to the time interval occurring between updates of the costs, and preferably lies in the renge of 5 seconds to 30 minutes.

3. Because of the rightmost IF-statement in Equation 1, LL1 is updated only if LL1 has changed by roughly 75 percent, or more. A similar comment applies to LL2, but the percentage is roughly 15 percent. Thus, a larger change in cost LL1 is required to induce an update in LL1, compared with LL2. "Change" refers to either an increase, or decrease, because the absolute value of the changed variable is used in the equations.

4. A phenomenon known as "oscillation" can occur in network routing. For example, as stated above, links having the lowest costs will tend to be the most popular, and can appear most often in the routing tables. However, if the cost of one of these popular links increases drastically, then other links will become popular, and will replace the previously popular links in the routing tables. These changes cause the lowest-cost paths to shift in position, or oscillate.

The variables alpha, $\alpha$, and beta, $\beta$, in the expressions above act as weights, or filters, to suppress oscillation. That is, in Equation 1, the updated cost LL1 depends on the previous D1 and on the previous LL1. But the relative weights given to the previous D1 and the previous LL1 depend on alpha, as Equation 1 indicates, thereby reducing oscillation.

It has been found that when alpha, $\alpha$, and beta, $\beta$, are both in a range between approximately 0.7 and 1.0, that high oscillations occur. On the other hand, when alpha and beta are both near zero, convergence of the processes computing the costs becomes very slow. Consequently, alpha is preferably held between 0.25 and 0.3, while beta is fixed at 0.25.

5. The invention utilizes load sharing. As background, load sharing will be first explained. It is possible that, in the shortest-time table of FIG. 2B, no single lowest-cost path exists between an origination node and a destination node. Multiple paths, of equal cost, may exist. Further, even if a lowest-cost path exists, other paths may exist which are only slightly higher in cost, and thus may be considered interchangeable with the strictly lowest-cost path.

These factors, and others, allow "load sharing," in which several paths are used simultaneously, in transmitting packets between an originating node and the destination node. In a sense, "parallel" lowest-cost paths exist between pairs of nodes. Since parallel paths exist, some routing tables will contain two next hops for a given final destination.

FIG. 4 provides an example. Dashed block 3 is an addendum to the type-2 routing table. This routing table (plus addendum) indicates that, for a path between an originating node F and a final destination node E, two next-hops are suitable: nodes D and B. These nodes D and B can share the load.

The invention implements load sharing, by defining two additional parameters, namely, UMAX and Z. Whenever a utilization variable, U, for a given link exceeds UMAX, the Dijkstra algorithm is instructed to consider additional paths for each destination reachable by that link, for both packet types (ie, types 1 and 2). To be considered, these additional paths must not differ in cost by more than a percentage Z. These additional paths are used for load sharing.

In addition, a type of hysteresis is imposed. Load sharing continues until the particular U falls below (UMAX−3Z). That is, the variable Z is trebled, and subtracted from UMAX, to determine the point at which to terminate load sharing. This hysteresis tends to reduce oscillations.

Restating the preceding:

1. When U for a given link exceeds UMAX, then paths are added to the lowest-cost path, provided the added paths are not more expensive than the lowest-cost path by Z.

2. The additional paths are used until the U falls below (UMAX−3Z), at which time the lowest-cost path is used exclusively.

6. In the equations above, "x" is given in milliseconds. The variable "x" is a generic variable, used to define the quantization functions QD and QU.

7. A variable D2 was defined, but not used in the equations given above (only D1 was used). This variable D2, together with the U's, D1's, LL1's, and LL2's, are reported to administrators of the network, and are used for solution of long-term network design problems. The variable D2 is not used in deriving the next-hop routing tables.

8. Examination of Equations 1 and 2 indicates that the primary dependent variables which change are L1, L2, D1, and U. Variable D2 is not a dependent variable.

One view of this dependence is that, for type-1 packets, each updated cost LL1(t+$\epsilon$) depends on (1) previous delay D1 (for type-1 packets) and (2) the previous LL1.

In contrast, for type-2 packets, the updated cost LL2 (t+$\epsilon$) depends on (1) utilization U, but not D1, and (2) the previous L2.

Restated, each updated cost depends on its previous value, and one other factor: previous delay D1 for cost L1, and previous utilization U for cost L2. Thus, Changes in delays D1 influence the updated routing tables for type-1 packets, and Changes in utilizations U influence the updated routing tables for type-2 packets, but changes in delays D1 do not.

It is a known fact that, at high data traffic conditions, queuing delays (or scheduling delays) tend to be the dominant factor in link delays, rather than transmission delays. The invention exploits this fact by two measures. One, it reduces the queuing delays for type-1 packets. That is, type-1 packets are "short," so that their waiting-times in their type-1 queues is "small," compared with a single-queue system.

The second measure is that the routing tables for type-1 packets are based on transit delays D1 (and other variables). Based on these two measures, type-1 packets spend less time in their queues, and are routed along paths having the lowest end-to-end delays.

In contrast, type-2 packets (the "less urgent" ones) are routed along the least-utilized paths.

FLOW CHART

Figure 5:
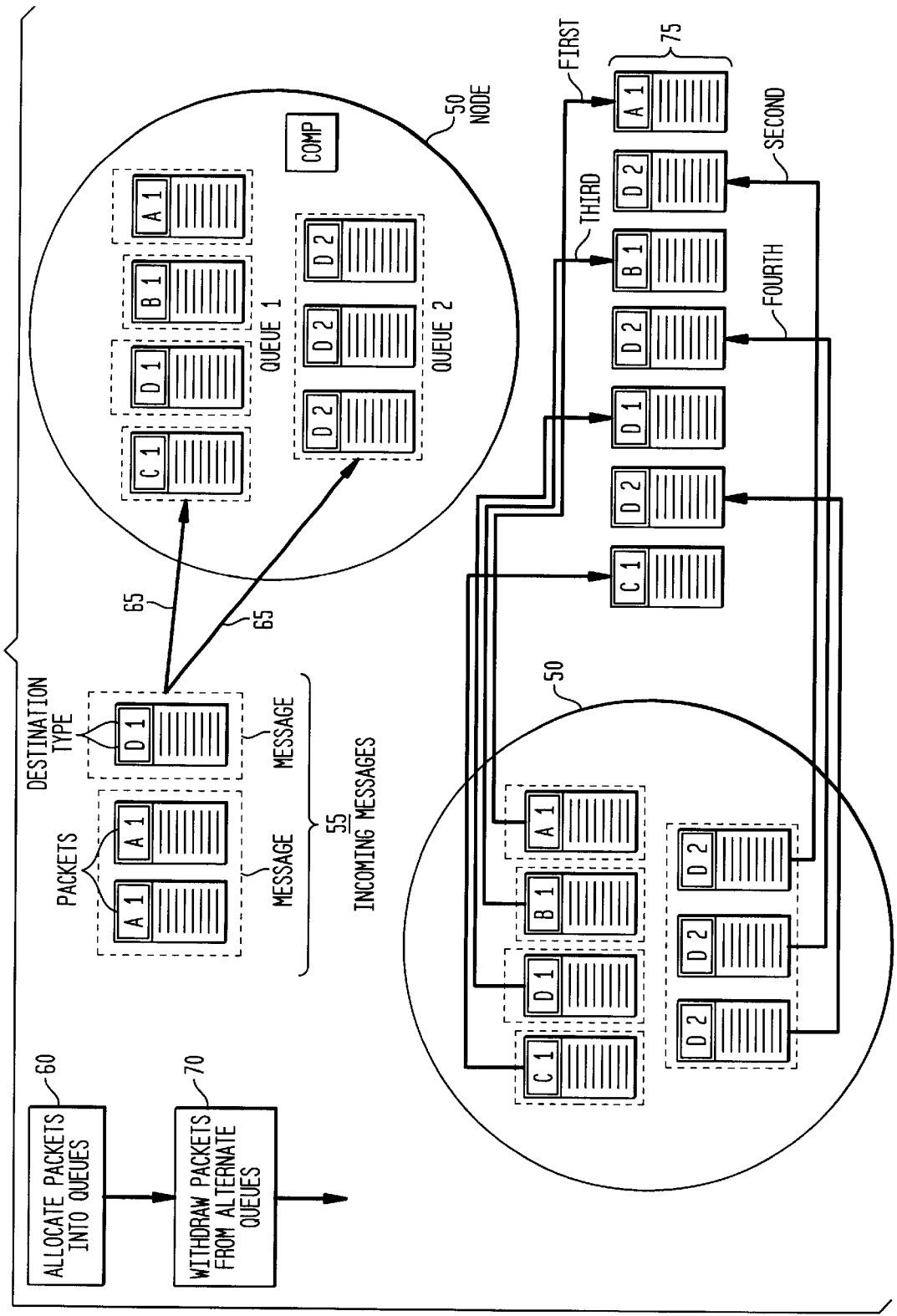
FIG. 5 illustrates the scheduling process and flow charts implemented by the invention.

FIGS. 5–8 illustrate a flow chart of logic undertaken by the invention. FIG. 5 illustrates operation of the scheduler used by the invention. A node 50 contains a computer COMP which runs the scheduling process.

Scheduling

Incoming packets 55 are received by the node 50. Each dashed box indicates one packet. Each packet contains one, or more, packets, as indicated. The packets contain identifiers which indicate the final destination and the packet type, as indicated.

As block 60 indicates, the packets are allocated into queues, according to the packet type, namely, type-1 or type-2. Arrows 65 indicate this allocation process. As block 70 indicates, the scheduler withdraws the packets from queue 1, then queue 2, then queue 1, and so on. Row 75 of packets indicates the interleaved packets. The symbols "FIRST," "SECOND," etc., indicate the order of withdrawing of the packets in the FIFO processing of the queues.

Routing

Figure 6:
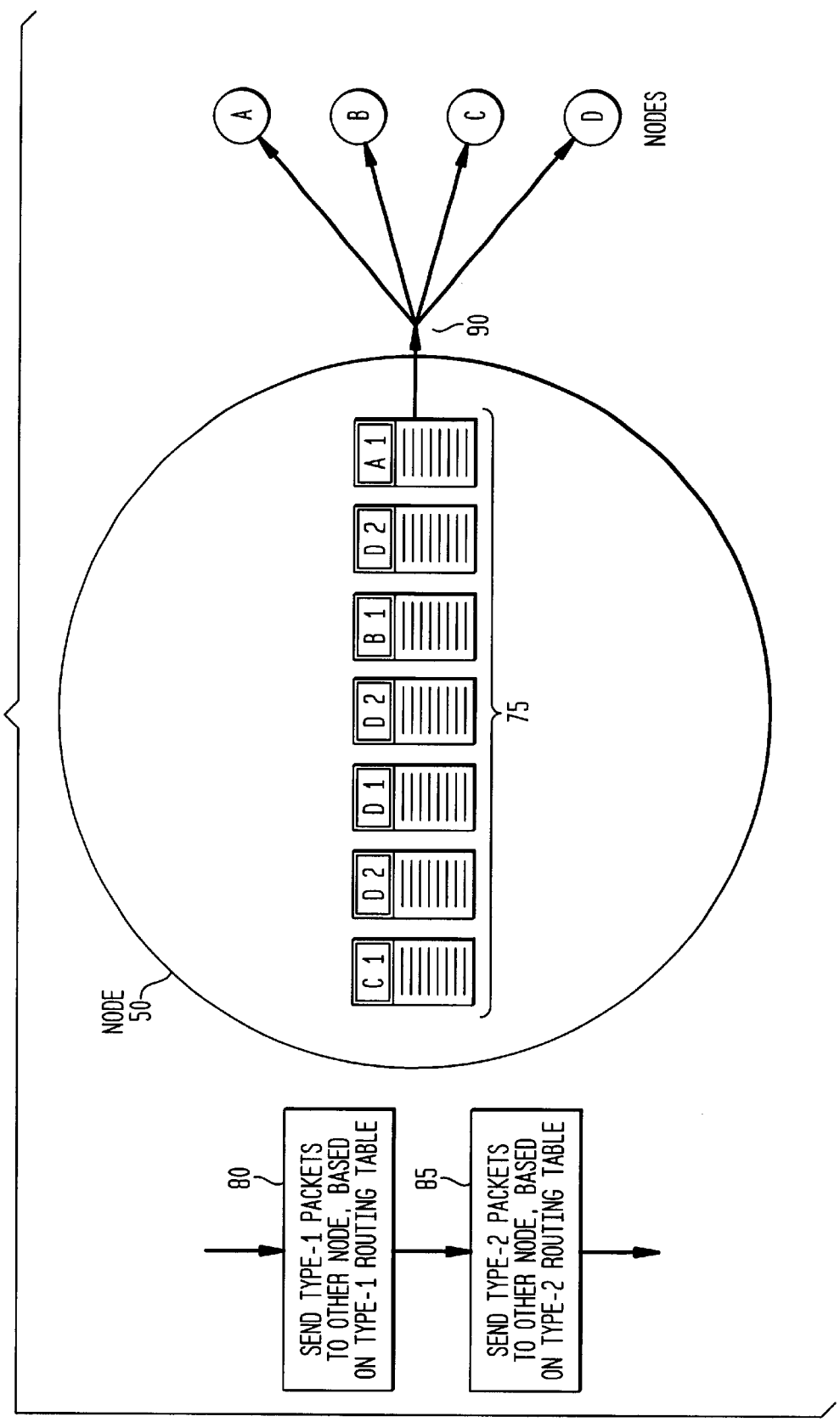
FIG. 6 illustrates flow charts and transmission of packets, once scheduled, by the invention.

FIG. 6 illustrates the routing process which follows scheduling. As block 80 indicates, the type-1 packets are sent to nodes, based on the type-1 routing table of node 50. The routing table implements next-hop routing. As block 85 indicates, the type-2 packets are sent to nodes, based on the type-2 routing table of node 50. Arrows 90 indicate this routing.

It should be remembered that the destinations stated in the row of packets 75 (e.g., A, B, C, etc.) do not necessarily coincide with the next hop, to which the packets are sent, unless that next hop happens to be the destination.

Each receiving node repeats the scheduling and routing processes just described, for the packets received.

Updating of Routing Tables

FIG. 7 illustrates the update procedures undertaken by the invention. Block 100 indicates that the delays, D, utilizations, U, and costs, L, are periodically updated. This updating utilizes the equations given above.

Block 110 indicates that both routing tables for all nodes are periodically re-computed, using the updated variables. Block 115 indicates that selected data is transmitted to a manager of the system. This manager can reside at one of the nodes. This selected data is used for general management purposes.

Summarizing the updating in another manner, the algorithm of the invention updates the link costs. After this updating, the invention utilizes the Dijkstra algorithm to update the routing tables. The updated routing tables may contain new shortest-paths, because of changes in the link costs.

Numerous approaches can be taken in implementing the steps shown in FIG. 7. For example, one single computer can ascertain all the data of block 100, perform the computations of block 110, and distribute the routing tables which are produced.

Alternately, one, or more, computers can be assigned to ascertain the data of block 100. These computers can distribute the data to all other computers, which independently compute their own routing tables. However, in this case, it is preferred that all computers utilize identical algorithms, so that the routing tables will be identical.

SIMULATION RESULTS

FIG. 8 illustrates results of a computer simulation of the invention's behavior, compared with the behavior of three other systems. FIG. 8A illustrates the network used, which contains eight nodes N. The three heavy links L1–L3 have a speed of 45 Mbits/sec, while the others have a speed of 1.5 Mbits/sec. All are bi-directional.

The three other systems tested are the following:

1. STATIC. Link costs are fixed. A single type of service is provided, and thus a single cost per link is used.
2. ANTOS. Link costs are updated, but a single cost is used per link.
3. AFIFO. Link costs are updated. Two types of service are provided, and thus two costs per link are used. Load sharing is not used. The costs are based on average delay for all packets, rather than for type-1 packets exclusively. (In contrast, as Equation 1 indicates, the invention updates costs based on the delay D1 for type-1 packets exclusively, and ignores delays of type-2 packets.)

Figure 8B:
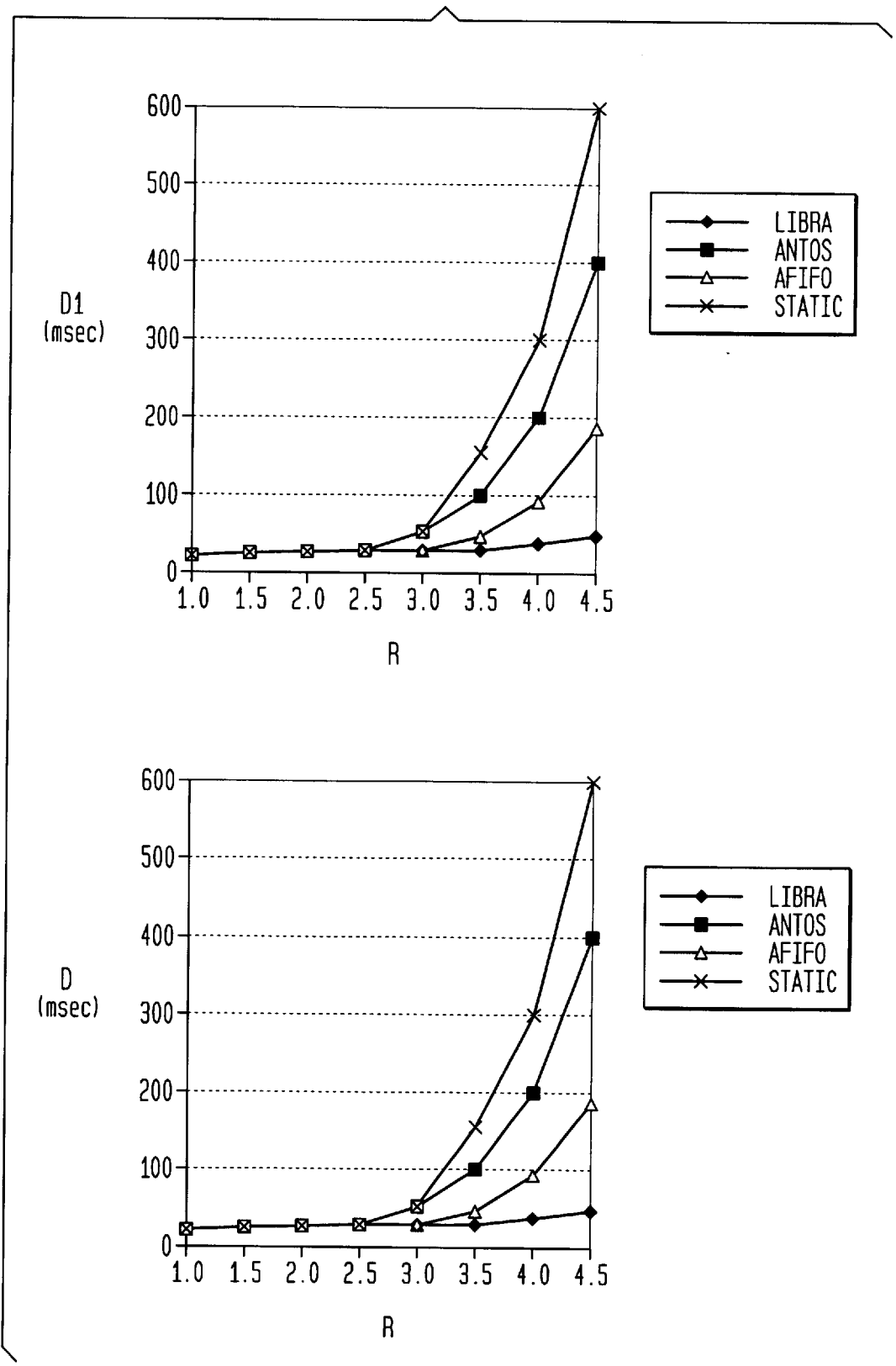
FIG. 8B illustrates results of the simulation.

FIG. 8B illustrates results of the simulation, in which an average delay, D, for all packets, and an average end-to-end delay, D1, for type-1 packets, D, are plotted against a parameter R. R is the ratio of (type-1 traffic/type-2 traffic).

Traffic sources were modeled by two-state Markov processes, which generate packet trains in the ON state. The generation rate was constrained to maintain R in the range from 1 to 5, as the Figure indicates. Type-1 packets were, on average, 128 bytes long, while type-2 packets were, on average, 2,000 bytes long. The Figure indicates that, in all cases, the invention provided superior delay performance.

FIG. 9 illustrates computer code which implemented the simulation. The "Trigger" module calls a "tick" routine, which computes the delay, d, and the utilization, u. Then, an "AQUA" module computes the link costs L1 and L2.

Numerous substitutions and modifications can be undertaken without departing from the true spirit and scope of the invention. What is desired to be secured by Letters Patent is the invention as defined in the following claims.

What is claimed is:

1. In a node in a computer network, the improvement comprising:
    a) a computer for receiving data packets, of first and second types, from other nodes; and
    b) program means for
        i) queuing packets of the first and second types into respective first and second queues;
        ii) routing packets in the first queue according to a first routing table; and
        iii) routing packets in the second queue according to a second routing table;
        iv) measuring average delay time taken by packets when they cross links, and using the average delay time to update the first routing table; and
        v) measuring average utilization of links, and using the average utilization to update the second routing table.

2. The network according to claim 1, and further comprising c) means for selecting packets alternately from the first and second queues, and routing the selected packets to respective other nodes.

3. The network according to claim 1, in which each packet contains an identifier indicating its type.

4. The network according to claim 1, and further comprising c) means for updating the routing tables at intervals.

5. The network according to claim 4, in which different parameters are used to update the two tables.

6. A method of operating a computer network, which comprises nodes, at least some of which maintain access to both (1) a first table for type-1 packets, and
(2) a second table for type-2 packets, both tables being of the next-hop routing type, comprising the following steps:
  a) receiving, at nodes, data packets, each bearing a tag identifying it as type-1 or type-2;
  b) routing the type-1 packets along respective paths which result in an average transit time T1;
  c) routing the type-2 packets along respective paths which result in an average transit time T2, which exceeds T1,
  d) measuring average delay time, ADT, of packets across links, and updating the first routing table using measured ADT; and
  e) measuring utilization of links, and updating the second routing table using measured utilization.

7. Method according to claim 6, in which the next-hop routing tables are updated at intervals, thereby changing the respective paths.

8. A method for routing data packets among nodes in a network, comprising the steps of:
  a) classifying each packet as either type-1 or type-2;
  b) tagging each packet with a destination node;
  c) for each node, maintaining, for each outgoing link from the node
    i) a queue for type-1 packets, and
    ii) a queue for type-2 packets;
  d) for each node, maintaining
    i) a next-hop routing table for type-1 packets, and
    ii) a next-hop routing table for type-2 packets;
  e) at each node, placing each incoming type-1 packet into the node's type-1 queue, and placing each incoming type-2 packet into the node's type-2 queue;
  f) at each node,
    i) withdrawing a packet from the type-1 queue;
    ii) ascertaining the destination node of the type-1 packet withdrawn;
    iii) based on the node's type-1 routing table and the destination node, ascertaining the next hop of the type-1 packet;
    iv) transmitting the type-1 packet to the node corresponding to the next hop;
    v) withdrawing a packet from the type-2 queue;
    vi) ascertaining the destination node of the type-2 packet withdrawn;
    vii) based on the node's type-1 routing table and the destination node, ascertaining the next hop of the type-2 packet;
    viii) transmitting the type-2 packet to the node corresponding to the next hop;
    ix) repeating (i) through (viii) as long as packets remain in the queues;
  g) at intervals, measuring average delays for type-1 packets for each link;
  h) at intervals, measuring average utilizations for each link;
  i) updating the routing tables for type-1 packets, using the average delays; and
  j) updating the routing tables for type-2 packets, using the average utilizations.

9. In a network, comprising nodes which are connected by data links, in which routing tables are used to find lowest-cost paths between nodes, the improvement comprising the following steps:
  a) for each link, computing two costs, LL1 and LL2, using the following expressions:

$$LL1_{ik}(t+\epsilon) = \left[ \begin{array}{ll} 1 + \text{INTEGER}\{(1-\alpha)Q_D[DI_{ik}(t)] + \alpha LL1_{ik}(t)\} & \text{IF} \left| \frac{LL1_{ik}(t+\epsilon) - LL1_{ik}(t)}{LL1_{ik}(t)} \right| \geq 0.75 \\ LL1(t) & \text{otherwise} \end{array} \right]$$

$$LL2_{ik}(t+\epsilon) = \left[ \begin{array}{ll} 1 + \text{INTEGER}\{(1-\beta)Q_U[U_{ik}(t)] + \beta LL2_{ik}(t)\} & \text{IF} \left| \frac{LL2_{ik}(t+\epsilon) - LL2_{ik}(t)}{LL2_{ik}(t)} \right| \geq 0.15 \\ LL2(t) & \text{otherwise} \end{array} \right]$$

in which $0 \leq \alpha \leq 1.0$ $0 \leq \beta \leq 1.0$ $Q_D(x) = 1 + \text{INTEGER}(97.5x)$ $Q_V(x) = 1 + \text{INTEGER}(x10^3)$ epsilon, $\epsilon$, represents an iteration interval
U represents utilization of respective links
D represents delay of respective links subscripts, ik, identify respective links, b) deriving two routing tables: a TABLE-1 based exclusively on costs LL1, and a TABLE-2 based exclusively on costs LL2;
  c) at intervals, repeating steps (a) and (b) and
  d) routing data packets of a first type, using TABLE-1, and routing data packets of a second type, using TABLE-2.

10. Method according to claim 9, and further comprising the step of
  d) recording the routing tables; and
  e) maintaining recorded routing tables in a historical record.

* * * * *